June 25, 1968  N. MARFORIO  3,389,668
SEWING MACHINE PROVIDED WITH A CUTTING DEVICE
Filed Oct. 12, 1965
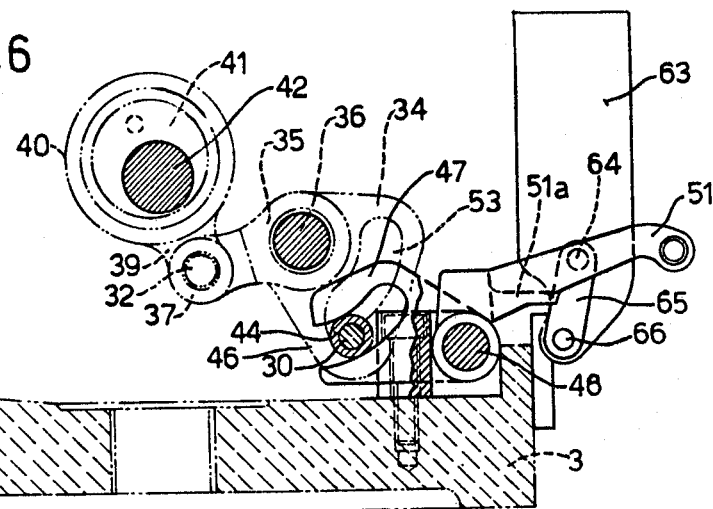
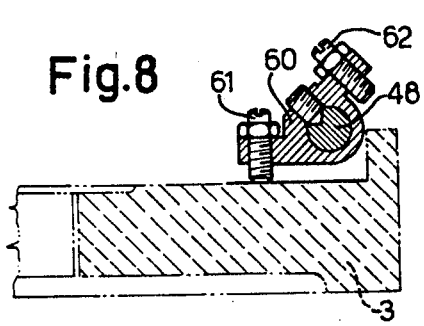
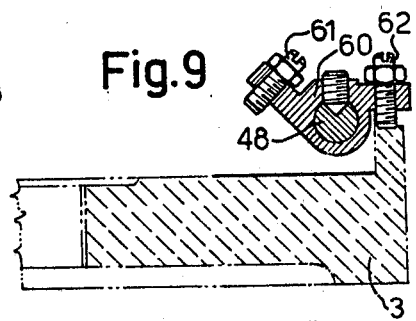
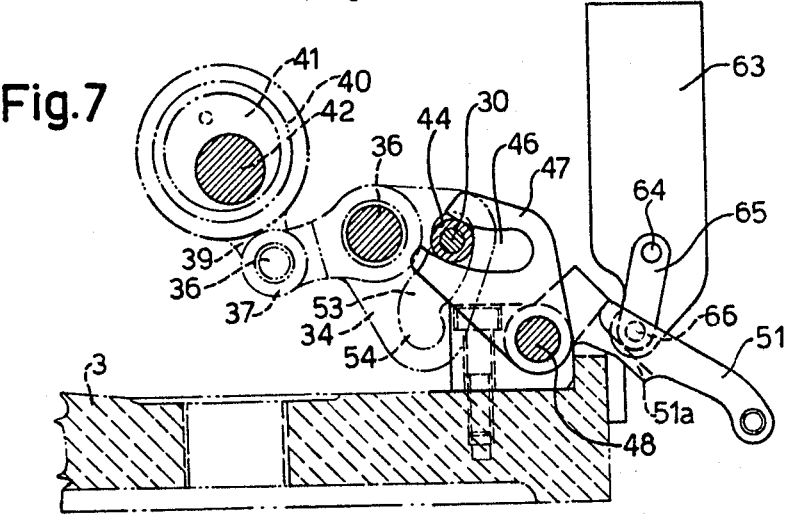

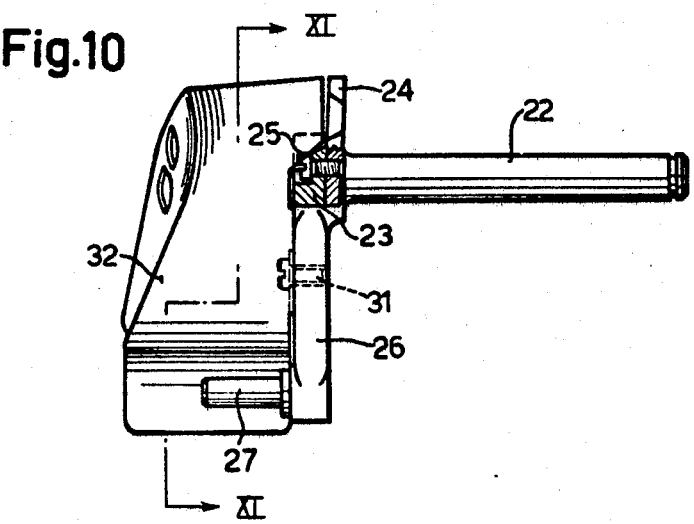
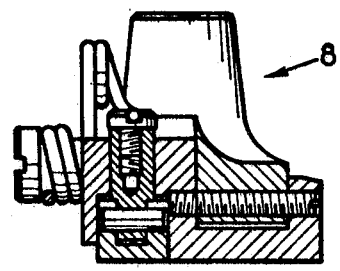
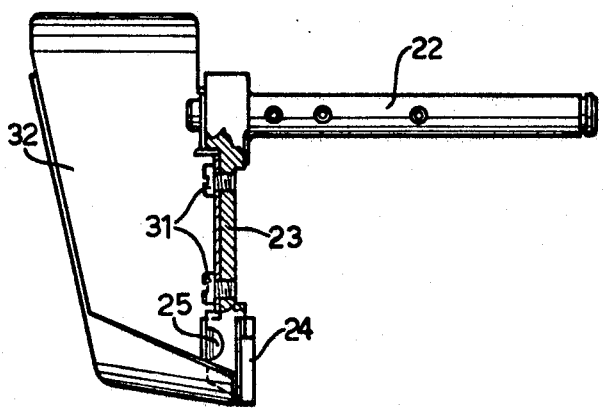

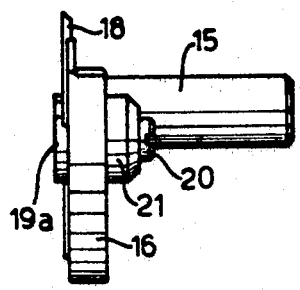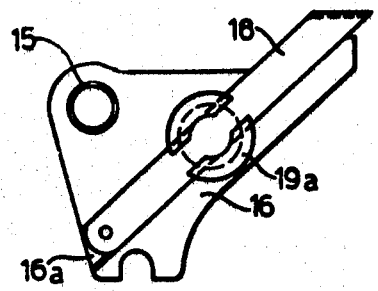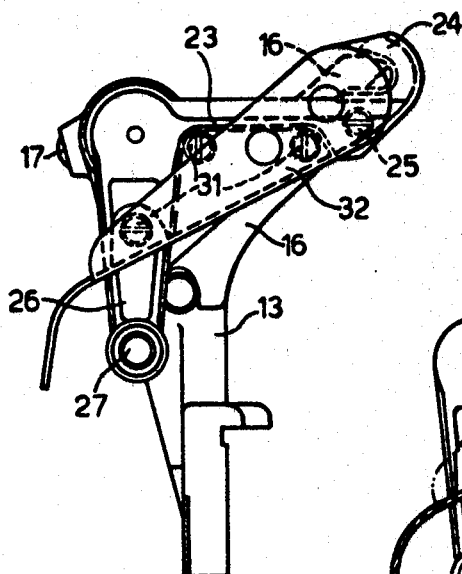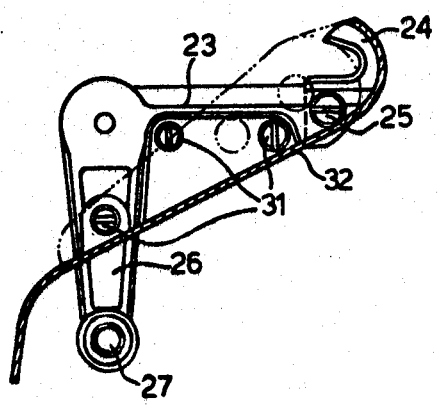

3,389,668
SEWING MACHINE PROVIDED WITH A
CUTTING DEVICE
Nerino Marforio, Milan, Italy, assignor to S.p.A. Virginio
Rimoldi & C., Milan, Italy
Filed Oct. 12, 1965, Ser. No. 495,213
Claims priority, application Italy, Nov. 16, 1964,
24,868/64
6 Claims. (Cl. 112—125)

ABSTRACT OF THE DISCLOSURE

A sewing machine having a main drive shaft arranged beneath a work table is provided with a cutting device for trimming seamed material near the seam. The cutting device comprises a stationary cutter having a cutting edge near the work table and a movable cutter having a cutting edge which at least partially overhangs the work table during its cutting movements. Mechanism is provided for displacing the movable cutter from its operative position during operation of the machine and for simultaneously stopping movement of the blade so that the operator of the machine can discontinue the trimming operation from time to time, for example to avoid cutting portions which it is desired to leave.

---

Figure 1:
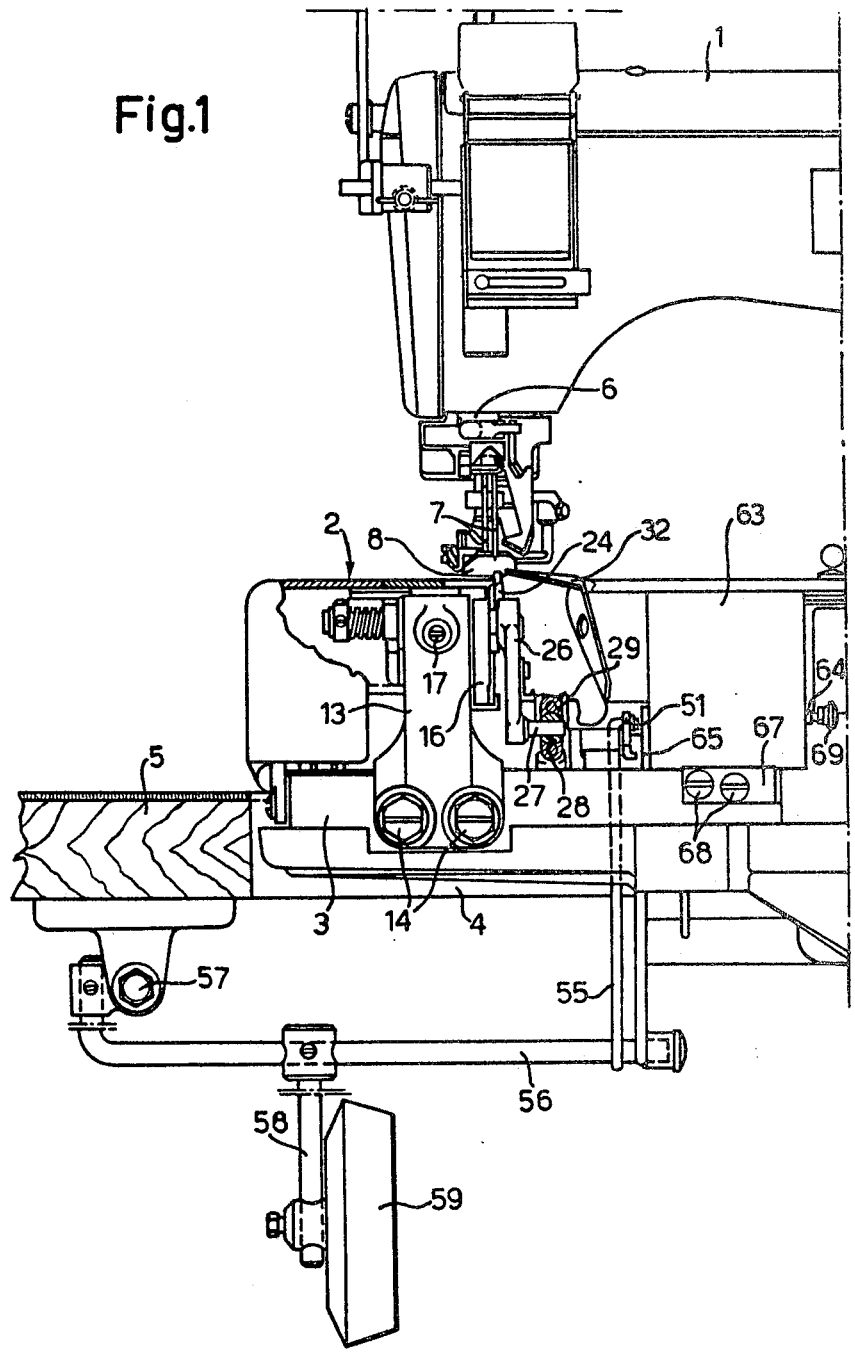

This invention relates to a sewing machine provided with a cutting device, the top blade of which can be lowered beneath the working table and stopped even during operation of the machine.

It is known that in sewing machines, more particularly of the so called arm type with a flat base and two or three needles, which effect four or five thread interlock seams, and even on machines effecting chain stitches, cutting devices which are also referred to as trimmers are employed.

These devices are adapted to trim the edge of the fabric for instance when lace or elastic bands are attached thereto as decoration or finishing of certain articles of wear, such as night-gowns with lace trimming round the neck and the arms, or slips having lace at the legs or an elastic band at the waist, the latter also applying to men's shorts.

The cutting or trimming device comprises a movable blade which is intermittently reciprocated and cooperates with a stationary blade to effect a scissors cut. The device considerably assists the attendant of the machine during the feeding of fabric to the feed members in that the attendant is relieved of the necessity of correcting supply or aligning the fabric edge in a given direction.

The cutting or trimming device allows full freedom of movement of the hand of the attendant who is merely engaged in effecting a continuous supply, since trimming of the fabric edge and alignment are taken care of by the trimming off of the excess material.

Trimming is more particularly useful when, as explained above, articles of wear are finished with lace or elastic bands for either decoration or functional purposes.

In special cases occurring with articles of wear, such as attachment of lace to the neck or arm openings of nightgowns, the lace has to be superposed on itself crosswise; in this particular operation the top blade of the trimming cutter performing an intermittent movement would considerably disturb the attendant in drawing the lace from its breaking device and introduce it into the guide of the presser foot in order to superpose it on the previously attached portion.

An object of this invention is to provide an improved cutting device which is controllable, even during operation of the machine, in order to move it to a position in which it does not interfere with the above described operations. According to this invention the above purpose is fulfilled by providing a sewing machine having a cutting device adapted to trim the edge of the sewn material near the region of the seam, comprising a stationary blade having its cutting edge turned upwardly near the working table over which the sewn material travels, and a movable blade cooperating with the stationary blade, having its cutting edge turned downwardly and situated during its cutting movements in part at least above the working table, movement of the movable blade being derived from a rotary shaft on the machine through an intermediate drive which permits displacement of the movable blade towards an inoperative position beneath the working table of the machine without stopping the latter in operation.

According to a further feature of the machine according to this invention, the drive is of such construction as to effect simultaneously with displacement of the movable blade towards its position beneath the working table, stoppage of the blade motion.

According to a further feature of this invention the machine is provided with a control adapted to act on the drive, comprising a lever for operation thereof by the attendant, and resilient means adapted to maintain said lever in its position corresponding to the operative position of the movable blade of the cutting device with which the sewing machine is equipped.

Figure 2:
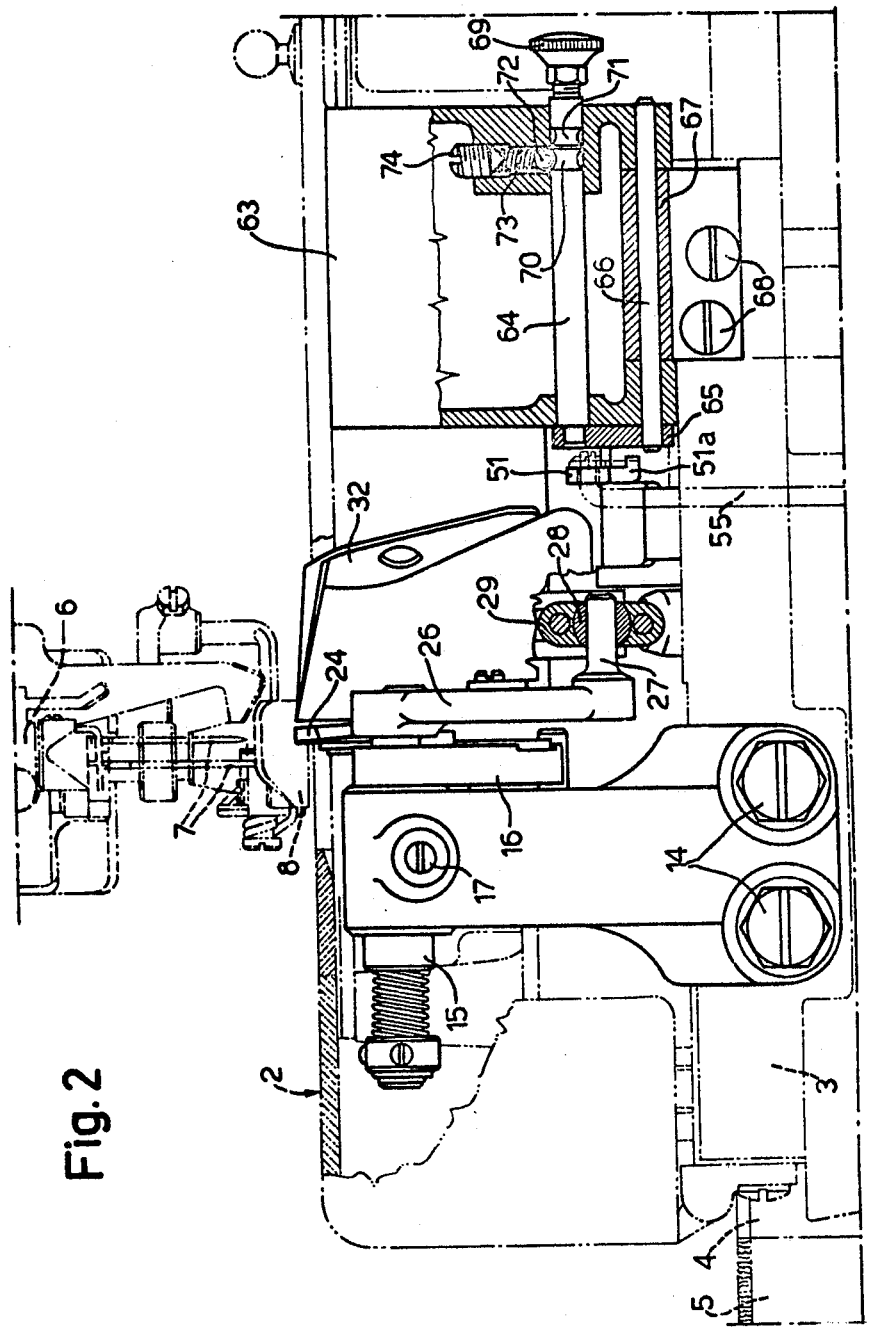
Figure 3:
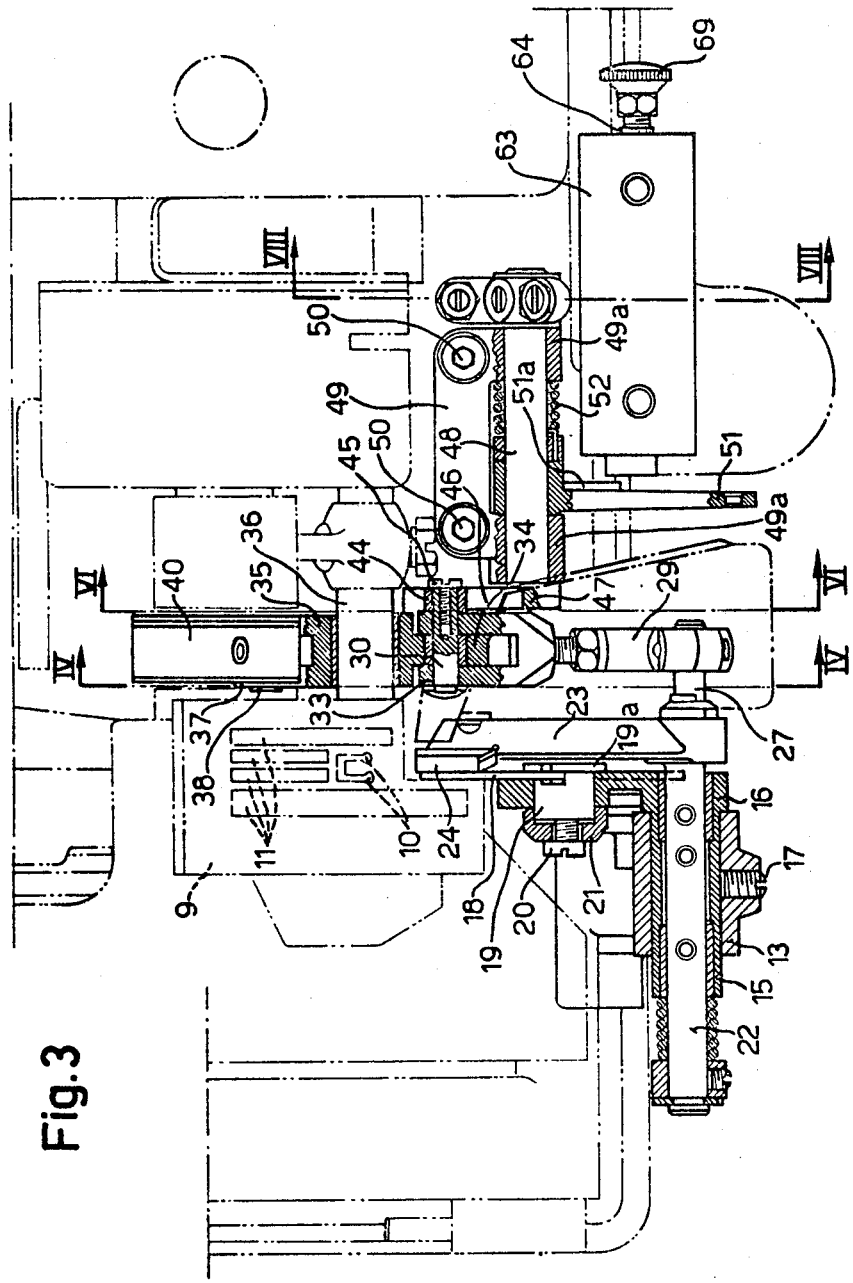
Figure 4:
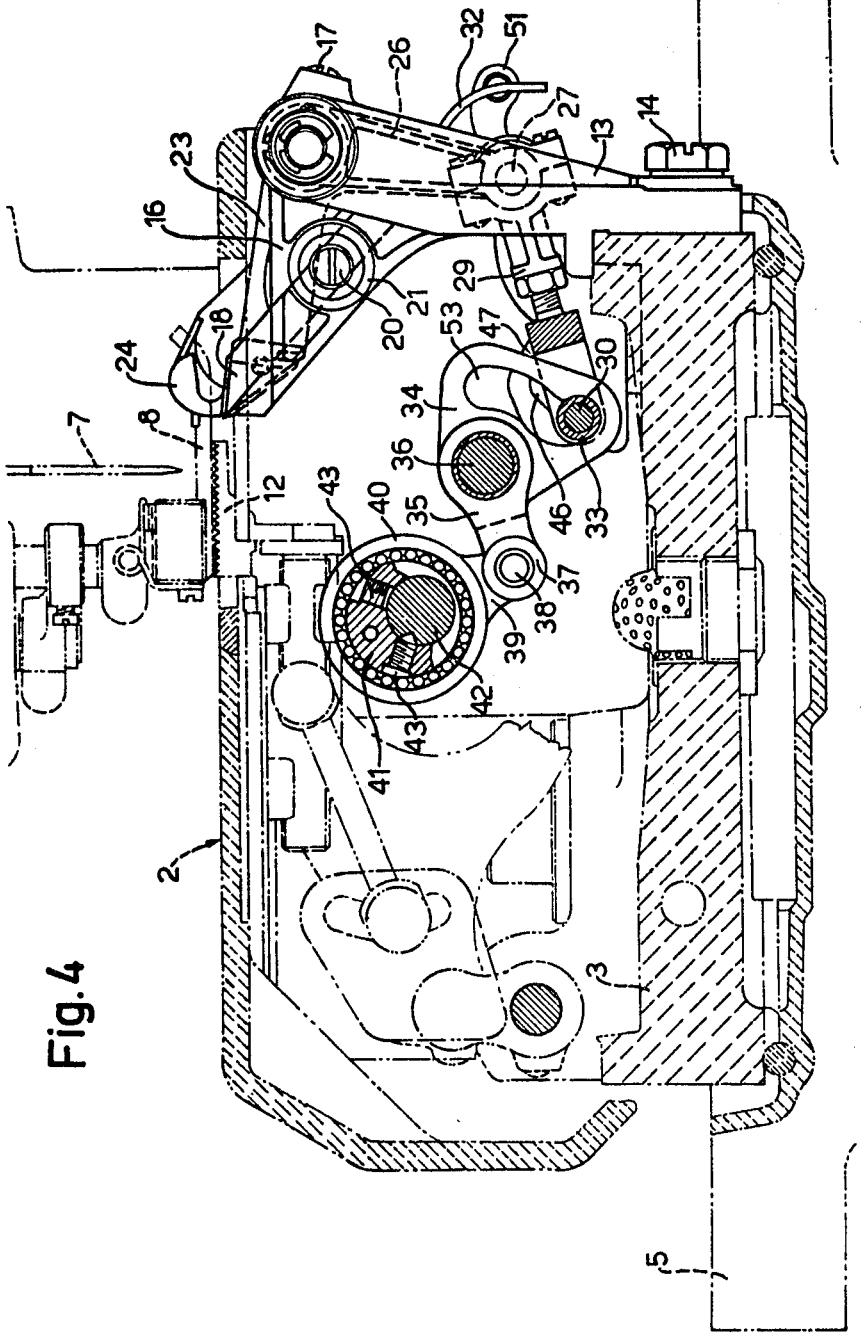
Figure 5:
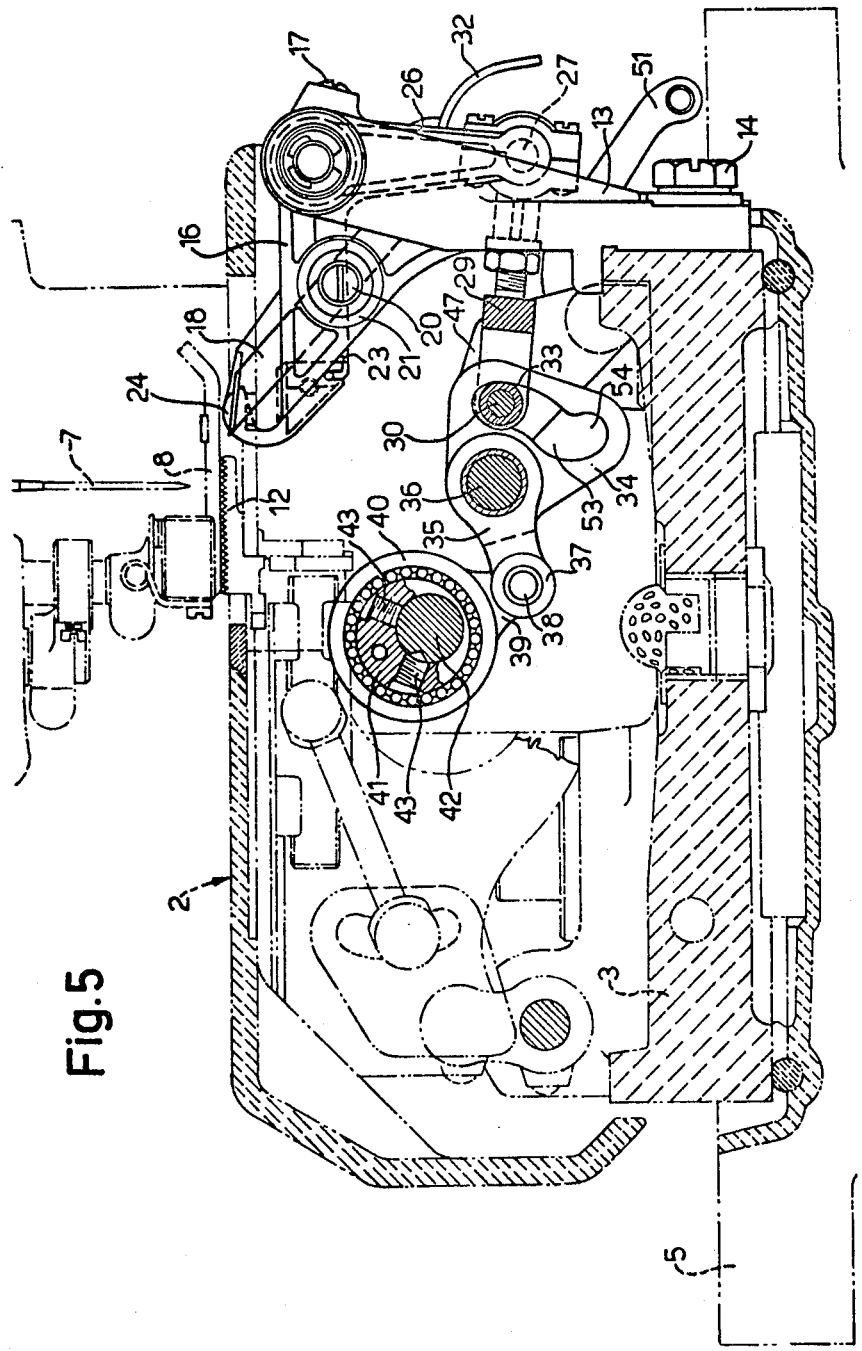

Further characteristic features and advantages of this invention will be clearly understood from the appended description referring by way of example to an embodiment shown on the accompanying drawings wherein:

FIGURE 1 is a side elevational view of the forward portion of a sewing machine of the arm type, provided with an improved trimming device according to this invention, FIGURE 2 is a side elevational view on an enlarged scale diagrammatically showing parts of the machine provided with the cutting device, the latter being shown in its operative position, FIGURE 3 is a part sectional plan view of the cutting device shown in FIGURE 2 and adjacent machine parts, FIGURE 4 is a sectional view on line IV—IV of FIGURE 3, FIGURE 5 is a sectional view similar to FIGURE 4, showing the same parts in their same positions corresponding to inoperative condition of the cutting device, FIGURE 6 is a sectional view on line VI—VI of FIGURE 3, FIGURE 7 is a sectional view similar to FIGURE 6, showing the same parts in their positions corresponding to the inoperative condition of the cutting device, FIGURE 8 is a sectional view on lines VIII—VIII of FIGURE 3, FIGURE 9 is a sectional view similar to FIGURE 8, showing the parts in their positions corresponding to the inoperative conditions of the cutting device, FIGURE 10 is a side elevational view of components of the movable portion of the cutting device, FIGURE 11 is a sectional view on line XI—XI of FIGURE 10, FIGURE 12 is a part sectional view from above of the unit shown in FIGURE 10, FIGURE 13 is an end view of the same unit, FIGURE 14 is a front elevational view of the stationary blade and supporting and lock members thereof shown in section in FIGURE 3 and in opposite front elevational views in FIGURES 4 and 5, FIGURE 15 is a side elevational view of the components shown in FIGURE 14.

Figure 16:
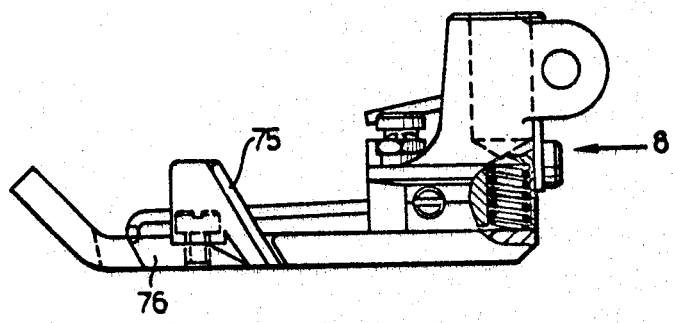
Figure 17:
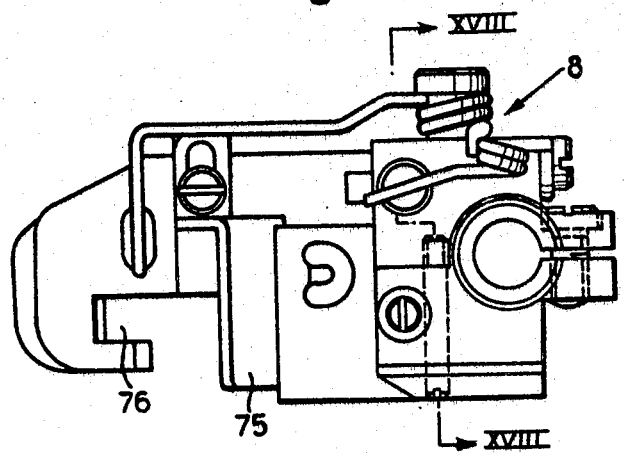

FIGURES 16, 17 and 18 are respectively a side, plan and sectional view on line XVIII—XVIII of FIGURE 17, showing the presser part of the sewing machine on which the improved cutting device according to this invention is mounted.

Corresponding parts are denoted by the same reference numerals throughout the figures.

The machine shown in the drawings comprises an arm 1 (FIGURE 1) extending above the working table 2 which is situated at the top of the bed-plate 3. The latter is secured at the region of the opening 4 formed in the top table 5 of the machine bed of known type. The end portion of the arm 1 supports the needle bar 6 having secured thereto two needles 7 and the short presser foot 8. The latter resiliently bears on the needle plate 9 (FIGURE 3) formed with holes 10 for the needles 7 to extend therethrough and openings 11 for the dogs 12 (FIGURES 4 and 5) which feed the sewn material.

The cutting device with which the machine is equipped is carried by a support 13 secured to the bedplate 3 of the machine by means of screws 14. The support 13 is formed at the top with a horizontal through hole in which a tubular extension 15 on a cross-plate 16 is fitted.

The tubular extension 15 is secured to the support 13 by a screw 17 which keeps it against angular or axial displacement with respect to the support.

The cross-plate 16 is formed with a through hole the axis of which extends parallel with the extension 15, its remote face from the extension 15 being formed with a guide groove 16a inclined about 45° to the working table 2 of the machine and symmetrically arranged with respect to the axis of the hole mentioned above.

The guide groove receives the stationary cutter 18 which is slightly larger in cross-sectional area than the groove 16a, so that the cutter extends by about one half beyond the face of the plate 16 in which the groove 16a is formed (FIGURE 14). A pivot 19 (FIGURE 3) is fitted into the abovementioned through hole and is formed in its head portion 19a enlarged in diameter with a through groove of an inverted T shape in cross section. The wider bottom portion of the groove equals in cross-sectional shape the groove 16a to allow the stationary cutter 18 to extend therethrough. The cutter 18 and the pin 19 are held stationary with respect to the plate 16 by a screw 20 screwed into an axial tapped hole in the small diameter end of the pivot 19 extending through a central hole in a cup 21 bearing on the plate 16.

The stationary cutter 18 is arranged so that its cutting edge is situated in proximity to the working table 2 and adjacent to but slightly spaced from, the needles 7, so that cutting is effected approximately along a line extending through the needles. This line along which the sewn material is trimmed can be displaced longitudinally of the machine. This may be done by loosening the screw 17 and actually displacing the tubular extension 15 on the plate 16 and the latter plate with respect to the support 13.

A pivot 22 (FIGURE 3), is rotatably mounted within the tubular extension 15 through the interposition of bushes and carries at its end near the plate 16 an arm 23. The latter extends transversely towards the region on the machine at which the needles 7 operate and carries at its free end the movable cutter 24 (FIGURES 10 to 14) secured thereto by a screw 25.

The pivot 22 further carries an arm 26 extending downwardly and ending in a lateral pivot 27 which has articulated thereto through a spherical head portion 28 (FIGURE 2) a connecting rod 29 provided at its opposite end with a fork articulated to the pivot 30 (FIGURES 3, 4 and 5). The arms 23, 26, which form together a bell crank lever carried at one end by the pivot 22, have secured thereto by means of screws 31 (FIGURES 11 and 13) a chute 32 adapted to convey the trimmings towards an opening cut in the table 5 of the machine bed and discharge them through a suitable guide arranged beneath the table to a collector for the trimmings (not shown).

The pivot 30 carried at the fork-shaped end of the connecting rod 29 carries a roller 33 (FIGURES 3, 4 and 5) slidable in a slot cut in a plate 34 fast with an arm 35 with which the plate forms a beam rotatably mounted on the shaft 36 which extends longitudinally in the bedplate 3 and acts to operate a looper (not shown) on the machine.

The arm 35 ends in a fork 37 articulated through a pin 38 to an extension 39 on a ring 40. The ring 40 is rotatably mounted through the interposition of a needle bearing on an eccentric 41 keyed to the main drive-shaft 42 of the machine by means of two screws 43.

The pivot 30, which carries roller 33 is slidably in a slot formed in the plate 34, extends beyond the fork of the connection rod 29 and carries at this region a roller 44 (FIGURE 3) rotatable on the pivot and retained against the latter by a screw 45. The roller 44 is guided by an arcuated slot 46 (FIGURES 6 and 7) cut in the plate 47 carried by pivot 48 extending longitudinally of the machine. The pivot 48 is rotatably mounted in a fork-shaped support 49 secured by screws 50 to the bedplate of the machine. The portion of the pivot 48 intermediate between the tabs 49a on the fork 49 has forced thereon a lever 51. A spring 52 is wound about the pivot 48 between the hub of the lever 51 and one tab 49a and acts to hold the lever 51 lifted and the pivot 48, plate 47 and pivot 30 in the positions shown in FIGURES 4 and 6. The lever 51 can be lowered against the action of the spring 52 in order to swing the plate 47 upwardly so that the latter by acting on the roller 44 moves the pivot 30 to the position shown in FIGURES 5 and 7. The slot cut in the plate 34, in which the roller 33 carried by the pivot 30 rolls, includes an upper constant curvature section 53, the centre of curvature of which is the axis of the shaft 36, and a lower arcuate section 54 which curves away from the axis of the shaft 36. Therefore, when the pivot 30 is in its position in which the roller 33 is received in the lower arcuate section 54 as shown in FIGS. 4 and 6, the plate 34 which is oscillated by the main driving-shaft 42 transmits to the connecting rod 29 a reciprocatory motion which is converted through the oscillations of the pivot 22 and bell crank lever 23, 26 to upward and downward movements of the movable cutter 24.

When the roller 33 carried by the pivot 30 is in its lifted position shown in FIGURES 5 and 7, the oscilations of the plate 34 about the axis of the said shaft 36 cannot effect any linear displacements of the pivot 30, and the connecting rod 29 does not transmit any oscillation to the pivot 22 and movable blade 24 which will keep stationary.

However, when displacing the pivot 30 from its position shown in FIGURES 4 and 6 to the positions shown in FIGURES 5 and 7, an oscillation and a longitudinal displacement of the connecting rod 29 are effected, which result in a downward oscillation of the arm 23 carrying the movable cutted 24 and chute 32 for guiding the trimmings. The movable cutter 24 and chute 32 then move from their operative position, in which the cutter 24 cooperates with the stationary cutter 18 in trimming the material being sewn, to their lowered positions beneath the working table 2.

The arcuated slot 46 cut in the plate 47 is in turn so shaped to a constant curvature the center of curvature of which is the axis of the shaft 36 when the plate 47 is in the position shown in FIGURE 6. The plate 47 is held in this position by the action of the spring 52 and through the provision of a stop to be described hereafter. The shape of the slot 46 permits free displacement of the roller 44 and pivot 30 without carrying along the plate 47 when the beam 23, 26 and the connecting rod 29 transmits motion to the movable cutter 24.

A pull-rod 55 (FIGURE 1) is fastened to the end of the lever 51 and ends by an eye, the steel rod being pivoted to the end of a horizontal rod 56. The latter is articulated at 57 to a support secured to the lower face of the table 5 which supports the machine. A vertical pivot 58 is adjustably secured to the rod 56 and has secured thereto a disc 59 lined with resilient material so that the operator of the machine can actuate the lever 51 by the movement of his knee.

An anchor 60 (FIGURES 8 and 9), is secured to the end of the pivot 48 opposite the plate 47. The anchor has two arms in which tapped holes are formed for adjustable positioning of screws 61, 62 with their lock nuts. The free ends of the screws 61, 62 abut portions of the bedplate 3, the screws being adjusted in position to determine a desired width of the oscillations of the lever 51. The screw 61 limits the downward stroke of the plate 47. Consequently, the action of the spring 52, which tends to hold the lever 51 lifted, does not affect the plate 34 when the roller 33 is in the arcuate section 54 in its respective slot. The machine is moreover provided with a disconnecting device adapted to hold the lever 51 in its lowered position so as to disconnect the cutting or trimming device permanently without any need for the operator to further press the disc 59 with his knee.

The disconnecting device comprises a support 63 (FIGURES 1, 2 and 3), of box shape having axially slidable therein in a longitudinal direction of the machine a pivot 64 protruding from both sides of the box. The end of the pivot facing the cutting device carries a link 65. The link is further slidably mounted on the end of a pin 66 acting as a hinge for the box shaped support 63 which can be tilted backwardly to permit access to the inside of the machine for threading the looper.

The pin 66 extends through a hole in a bracket 67 secured by means of screws 68 to the machine bed 3. The other end of the pivot 64 carries a small grip 69 by which the pivot 64 and link 65 can be axially displaced. The possible axial positions of the pivot 64 are determined by two angular radial grooves 70, 71, respectively, adapted to engage a ball 72 pressed downwardly by the spring 73, the tension of which is adjustable by means of the screw 74. By moving the pivot 64 to a position in which the ball 72 is engaged by the groove 71, the link is moved to engage a projection 51a on the lever 51, whereby the lever 51, once it has been lowered, cannot resume its starting position notwithstanding the action of the spring 52.

When returning the pin 66 to its position shown on the drawings, the link 65 is released from the projection 51a on the lever 51, so that the latter is free to oscillate upwardly under the bias of the spring 52.

Summarizing, it may be said again that the device according to this invention is adapted to move the movable or trimming cutter from its operative position in a downward direction as necessary for sewing lace, elastic lace or elastic in order to superpose in a parallel or diagonal relationship the lace on the elastics previously attached during finishing of the sewn article of wear. The necessity for such operations arises, for instance, during sewing of the lace to the openings for the neck and arms of nightgowns, finishing of brassiere on the night-gowns with a V shape at which the lace has to be attached at an acute angle. Further examples may be mentioned such as attachment of the lace or elastic lace to the leg openings in women's slips which have been previously closed, when a finishing with a superposition of the lace in so called shawl form is required, or attachment of elastic to the waist of slips when finishing by parallel superposition of the elastic is required.

Consideration to the above mentioned operations shows that lowering of the movable cutter of the cutting or trimming device eliminates the obstacle otherwise experienced by the operator against easy manipulation of the lace and elastic which have to be removed for proper positioning from the usual guide 75 (FIGURES 16 and 17) formed in the presser foot, and arranged at the rear of the clearance 76 through which the movable cutter 24 projects when it is not withdrawn by lowering of the lever 51. Moreover, when the circumstances due to the particular work required the device to be inoperative, the latter can be moved to and permanently held in said inoperative position through the provision on the machine of the above described means.

It will be understood that, within the principle of this invention, the various constructional details of the latter can be widely varied with the example described and illustrated without departing from the scope of the invention.

What I claim is:

1. A sewing machine having a working table, a bed plate supporting the latter, a rotary main drive shaft arranged beneath the working table, a cutting device adapted to trim the edges of sewn material near the region of the seam and arranged inside the bed plate and comprising a stationary cutter having a cutting edge near the working table over which the material is fed, and a movable cutter cooperating with said stationary cutter and having a cutting edge positioned during its cutting movements at least in part above said working table, said cutting device further comprising a bell-crank lever having one arm extending transversely of the working table of the machine below said table and carrying said movable cutter and a second arm extending downwardly of said working table, a disengageable transmission interposed between said rotary main drive shaft and the free end of said second arm of the bell-crank lever, the said transmission comprising a beam mounted rockingly about an axis parallel to the said main drive shaft and having an arm bifurcated at its end extending beneath said main drive shaft and a plate perpendicular to said axis formed with a guide, said transmission comprising further an eccentric keyed on the said main drive shaft, a ring mounted rotatably on said eccentric, an extension on said ring articluated to the bifurcated end of said arm of the beam, and a connecting rod hinged by its one end to the free end of said second arm of the bell crank-lever and having a pivot at the other end of said connecting rod engaging said guide formed in the plate forming part of said beam and having a shape such that on movement of the said pivot from one to the other end of the guide said connecting rod is displaced by a width such as to rotate said bell-crank lever through an angle great enough to displace the movable cutter from its operative position to a position in which it is hidden below the working table of the machne, and means for displacing the pivot engaging said guide along the latter.

2. A machine as claimed in claim 1, wherein the guide in the plate forming part of said beam comprises a slot having a constant curvature arcuate section, the centre of curvature of which is the axis of rotation of the said beam, and a second arcuate section having a curvature varying in respect to said constant curvature arcuate section.

3. A machine as claimed in claim 2, wherein a lateral projection is formed on the pivot engaging the slot in the plate forming part of the said beam, and the said means for displacing said pivot along said slot comprises a lateral plate mounted for rotation about an axis parallel to said main drive shaft and having an arcuate slot formed therein engaged by said lateral projection on the said pivot, a control lever secured to said lateral plate and spring means biasing the latter and tending to hold it in a position corresponding to engagement of said pivot by said second arcuate section of the slot provided in the plate forming part of said beam, consequently corresponding to the operative position of the movable cutter of the trimming device.

4. A machine as claimed in claim 3, wherein said arcuate slot in the said lateral plate is of constant curvature with its centre of curvature on the axis of rotation of the said beam when the said pivot is engaged by said second arcuate section of the slot cut in the plate forming part of the beam.

5. A machine as claimed in claim 4, wherein a pair of stops fast with the machine bed plate are provided for determining the angle of rotation of the said lateral plate between its positions corresponding to the operative and retracted positions, respectively, of the movable cutter of the trimming device with respect to the working table of the machine.

6. In a sewing machine comprising a work table, a main drive shaft arranged beneath the work table, a trimming device adapted to trim the edges of sewn material near the seam during operation of the machine, said trimming device comprising a stationary cutter having a cutting edge near the work table, a movable cutter cooperating with the stationary cutter and having a cutting edge which is at least in part above said work table when said movable cutter is in operative position, actuating means for reciprocating said movable cutter to cooperate with said stationary cutter to trim said material and operator operable means for displacing said movable cutter to an inoperative position below said work table, said actuating means comprising an oscillatable plate having a cam slot therein, means connecting said oscillatable plate with said main drive shaft to impart an oscillating movement to said plate, said cam slot comprising a first arcuate portion of constant curvature concentric with the axis of oscillation of said oscillatable plate and a connecting second arcuate portion having a curvature varying with respect to that of said first arcuate section, a cam follower received in said slot, means connecting said cam follower with said movable cutter and means for positioning said cam follower in said second section of said cam slot when said movable cutter is in operative position, whereby actuation of said cam follower by said second arcuate portion of said cam slot products reciprocation of said movable cutter, and for positioning said cam follower in said concentric first section of said cam slot when said movable cutter is in inoperative position, whereby said cam follower is not actuated by said cam slot and hence said movable cutter is not reciprocated.

References Cited
UNITED STATES PATENTS

| | | | |
|---|---|---|---|
| 1,177,138 | 3/1916 | Ringe | 112—122 |
| 1,353,534 | 9/1920 | Hughes | 112—122 |
| 2,667,850 | 2/1954 | Galkin | 112—122 |

JORDAN FRANKLIN, *Primary Examiner.*

H. HAMPTON HUNTER, *Examiner.*